(12) United States Patent
Inzinna, Jr.

(10) Patent No.: US 7,877,294 B2
(45) Date of Patent: Jan. 25, 2011

(54) COMPUTER IMPLEMENTED METHOD AND SYSTEM FOR FORMULATING HAIRCOLOR

(75) Inventor: Charles J. Inzinna, Jr., Pittsford, NY (US)

(73) Assignee: Salon Technologies, Inc., Rochester, NY (US)

( * ) Notice: Subject to any disclaimer, the term of this patent is extended or adjusted under 35 U.S.C. 154(b) by 1490 days.

(21) Appl. No.: 11/260,098

(22) Filed: Oct. 27, 2005

(65) Prior Publication Data

US 2006/0033907 A1 Feb. 16, 2006

Related U.S. Application Data

(63) Continuation-in-part of application No. 11/136,774, filed on May 25, 2005, now abandoned.

(60) Provisional application No. 60/574,736, filed on May 27, 2004.

(51) Int. Cl.
*G06Q 30/00* (2006.01)
(52) U.S. Cl. .......................................... 705/26
(58) Field of Classification Search ................... 705/26, 705/27
See application file for complete search history.

(56) References Cited

U.S. PATENT DOCUMENTS

| | | | |
|---|---|---|---|
| 4,114,632 A | | 9/1978 | Morganroth |
| 5,671,735 A | | 9/1997 | MacFarlane et al. |
| 6,067,504 A | | 5/2000 | MacFarlane et al. |
| 6,129,664 A | * | 10/2000 | Macfarlane et al. ......... 600/315 |
| 6,490,492 B1 | | 12/2002 | Fertig et al. |
| 6,622,064 B2 | | 9/2003 | Bartholomew et al. |
| 6,719,565 B1 | * | 4/2004 | Saita et al. ............... 434/94 |
| 6,833,937 B1 | | 12/2004 | Cholewo |
| 6,980,888 B2 | | 12/2005 | Baker et al. |
| 6,993,512 B2 | * | 1/2006 | McClanahan ............... 706/12 |

(Continued)

FOREIGN PATENT DOCUMENTS

WO     WO 02/083282 A1 * 10/2002

OTHER PUBLICATIONS

"Clairol introduces a computer imaging system to allow customers to view simulated haircolor and makeup changes before they are made.", PR Newswire, May 12, 1986. Retrieved from Dialog File: 148, #02857479.*

(Continued)

*Primary Examiner*—Naeem Haq
(74) *Attorney, Agent, or Firm*—Robert D. Gunderman, Jr.; Patent Technologies, LLC

(57) ABSTRACT

A computer implemented method and system for determining the formula or formulas of haircoloring agents to be used in the process of coloring hair, including the steps of receiving input on the current color, state, and desired color of the hair, and using a database of haircoloring formulas to determine the coloring agents to be used, quantities of such coloring agents, application time of such coloring agents, and refreshing options that can be applied to the hair to treat and correct faded hair ends. The computer in some embodiments is portable, and includes a processor, an electronic storage means in which the haircolor formula database is stored, and software that defines the process by which the correct haircolor formula is determined. The computer software determines the best formula and process steps to be taken to achieve the desired haircolor.

27 Claims, 12 Drawing Sheets

U.S. PATENT DOCUMENTS 6,994,552 B2  2/2006  Hirata et al.
7,057,641 B2 *  6/2006  Bodnar et al. ............... 348/188

OTHER PUBLICATIONS

Molly Prior, "HCD brings salon color to PBC aisles.", Drug Store News, Jun. 21, 2004. Retrieved from Dialog File: 148, #0017144865.*

"ModiFace Inc. Introduces Face Visualization Platform For Fully Automated, Scalable and Cost-Effective Online and Mobile Beauty Apps.", Business Wire, Sep. 15, 2008. Retrieved from Dialog File: 16, #15268255.*

* cited by examiner

| TARGET COLOR: 7CG | | GRAY LEVEL: Less Than 50% | COLOR LINE: MATRIX® SOCOLOR® |
|---|---|---|---|
| 11 | COLOR | 1-1/2oz 7CG + 1/2oz 7 + 2oz 10vol (30-45 min.) | |
| VIRGIN RETOUCH 10 | | 1oz 7CG + 1/2oz 7 + 1-1/2oz 10vol (30-45 min.) | |
| VIRGIN RETOUCH 9 | COLOR | 1-1/2oz 7CG + 1/2oz 7 + 2oz 10vol (30-45 min.) 1oz 7CG + 1/2oz 7 + 1-1/2oz 10vol (30-45 min.) | |
| VIRGIN RETOUCH 8 | COLOR | 2oz 7CG + 2oz 10vol (30-45 min.) 1-1/2oz 7CG + 1-1/2oz 10vol (30-45 min.) | |
| VIRGIN RETOUCH 7 | COLOR | 2oz 7CG + 2oz 10vol (30-45 min.) 1-1/2oz 7CG + 1-1/2oz 10vol (30-45 min.) | |
| VIRGIN RETOUCH 6 | COLOR | 2oz 7CG + 2oz 20vol (30-45 min.) 1-1/2oz 7CG + 1-1/2oz 20vol (30-45 min.) | |
| VIRGIN RETOUCH 5 | COLOR | 2oz 7CG + 2oz 20vol (30-45 min.) 1-1/2oz 7CG + 1-1/2oz 20vol (30-45 min.) | |
| VIRGIN RETOUCH 4 | COLOR | 2oz 7CG + 2oz 30vol (30-45 min.) 1-1/2oz 7CG + 1-1/2oz 30vol (30-45 min.) | |
| VIRGIN RETOUCH 3 | PRE-LIGHTEN | 2oz 7CG + 2oz 40vol (30-45 min.) 1-1/2oz 7CG + 1-1/2oz 40vol (30-45 min.) | |
| VIRGIN RETOUCH 2 | PRE-LIGHTEN | 2oz bleach + 4oz 20vol (30-45 min. to lighten up to level 8) 1-1/2oz bleach + 3oz 20vol (30-45 min. to lighten up to 8) | 2oz 7CG + 2oz 10vol (20-30 min.) 1-1/2oz 7CG + 1-1/2oz 10vol (20-30 min.) |
| VIRGIN RETOUCH 1 | PRE-LIGHTEN | 2oz bleach + 4oz 20vol (30-45 min. to lighten up to level 8) 1-1/2oz bleach + 3oz 20vol (30-45 min. to lighten up to 8) | 2oz 7CG + 2oz 10vol (20-30 min.) 1-1/2oz 7CG + 1-1/2oz 10vol (20-30 min.) |
| VIRGIN RETOUCH | | 2oz bleach + 4oz 20vol (30-45 min. to lighten up to level 8) 1-1/2oz bleach + 3oz 20vol (30-45 min. to lighten up to 8) | 2oz 7CG + 2oz 10vol (20-30 min.) 1-1/2oz 7CG + 1-1/2oz 10vol (20-30 min.) |

Fig. 5 copyright © 2005 SalonTechnologies

COMPUTER IMPLEMENTED METHOD AND SYSTEM FOR FORMULATING HAIRCOLOR

CROSS-REFERENCE TO RELATED PATENT APPLICATIONS

This application is a continuation in part of applicant's patent application Ser. No. 11/136,774 filed on May 25, 2005, now abandoned which claims the benefit of the filing date of U.S. provisional patent application Ser. No. 60/574,736 filed on May 27, 2004.

BACKGROUND OF THE INVENTION

1. Field of the Invention

The present invention relates to a computerized method and system for formulating haircolor.

2. Description of the Related Art

The process of coloring hair is one that contains a great many variables and possible outcomes. Hair stylists attempt to more fully define this process through the use of notes, charts provided by haircolor manufacturers, past experience, and consultation with other hair stylists. The typical client of a haircoloring stylist will request a specific target haircolor. It is up to the hair stylist to determine the optimal formulas, process steps and application times required to achieve the specified target haircolor. The resulting post color application haircolor is determined in part by the current haircolor, the process steps followed, the previous applications of color or other haircolor products, environmental factors, and the like. This plethora of variables is particularly vexing to the novice hair stylist. The same hair dye often has dramatically different effects when used on two different clients. These variations are frequently due to subtle differences in the color, texture, and porosity of the two client's hair.

As novices become more adept in the art, their haircoloring skills become more refined. Frequently, junior hair stylists are trained by a more senior haircoloring expert. This expert has experience identifying the factors involved in haircoloring and thus can produce haircolor formulas and processes with a higher degree of success. However, even an expert in the field can be confounded by the variability in haircolors that are provided by different haircolor manufacturers. Hair stylists are often taught their trade at a specific salon. A given salon typically utilizes a single color line (i.e. a set of haircoloring products from one manufacturer). Thus, the stylist learns the haircoloring techniques associated with a specific color line. Should the stylist transition to a different salon, he or she may need to relearn these haircoloring techniques employing a different color line.

These interdependent variables frequently result in a haircolor that is not the same as the target color specified by the client. This mismatch between expected and actual colors will result in an unhappy client, loss of business by the hair stylist, and damage to the reputation of the salon.

There are multiple reasons a person wishes to have his or her hair colored. For example, one may wish to undergo a color change from a natural haircolor to a different haircolor (i.e. a "virgin application"). One may wish to reapply haircolor to the newly grown roots of previously colored hair (i.e. a "retouch application"). Additionally, one may wish to apply streaks of color to selected portions of the hair (i.e. a "foil application"). One may wish to change haircolor from a non-natural haircolor to a different color (i.e. a "retouch"). In any or all of these application types, one should preferably identify a number of properties of the hair prior to applying the haircolor. Such properties include, but are not limited to, starting color (either natural or non-natural), hair texture, tenacity, porosity, percentage of gray, previous haircoloring history, and the like. Additionally, the dying process may be comprised of more than one step. One may need to "pre-lighten" the hair by applying a high-lifting color or bleach before the coloring step. One may need to "tone" the hair by applying a mixture of haircolor and developer after the coloring step.

As is known to one skilled in the art, haircoloring follows the traditional rules of complimentary colors. Reference will be had to FIG. 3 wherein a color star is depicted. The primary colors of red, yellow, and blue, and the secondary colors of orange, green, and violet are illustrated in this color star. The secondary colors are mixtures of two primary colors (e.g. orange is a mixture of yellow and red). Similarly, tertiary colors can be generated by mixing a primary and a secondary color (e.g. yellow-orange (gold) which is a mixture of yellow and orange). As is apparent to one of ordinary skill in the art, one can use this color star to identify complimentary (i.e. counteracting) colors to shift the color of hair. To neutralize a given shade, one treats with that shade's complimentary color. Thus, by way of illustration, to remove red, one would apply a green dye.

As is apparent, the typical color of most human hair is not a simple primary color combination. Without wishing to be bound to any particular theory, applicants believe that all haircolor is essentially based on shades of the tertiary color brown plus one dominating tone. For example, blonde hair is simply the lightest brown with dominating yellow. Red hair is brown with dominating orange. Black hair is a dark brown with dominant blue.

One can utilize the color star to shift the color of a client's hair from a first color to a second color using haircoloring products which are commercially available. By way of illustration, one may use the haircoloring products of MATRIX®. By way of further illustration, one may use the haircoloring products of other manufacturers such as Redken®, Schwartzkopf®, Nexxus®, Goldwell® and others. Although each of the manufacturers provides the elements necessary to generate haircolor formulas, it is often necessary for the stylist to actually produce the formulas based on the stylist's experience. The manufacturers offer only generalized guidelines to assist in the production of formulas.

Many of these haircoloring formulas have common elements. Typically, a haircolor formula comprises four or more ingredients, including ammonia, a base, color pigments, and a developer. It should be noted that the exact nature of the ingredients varies by color line, adding to the complexity of the coloring process. Thus a stylist who is experienced with one color line may have difficultly making formulas with the elements provided by a second color line.

The base provides the medium for application and may optionally include additional hair treatment agents, for example moisturizer and the like. Typical bases include creams, oils, waxes, shampoos, panthenol, wheat proteins, and the like. The color pigments provide the coloration for a particular dye. Most color pigments function by adhering to proteins found in hair. Ammonia provides two functions. Firstly, it provides an alkaline pH which promotes the adhesion of the color pigment to the hair. Secondly, it swells the hair for easy penetration of the color pigments. The last ingredient, developer, is typically an oxidizing agent, such as Hydrogen Peroxide, which functions to "lift" a degree of color from the hair, thus making it lighter. In one embodiment, oxygen gas is released during the oxidation. This localized concentration of oxygen promotes the adhesion of color pigments. Color lines often refer to developer in terms of 10

Volume, 20 Volume, 30 Volume, or 40 Volume. The term Volume, as used in this specification, means the concentration of Hydrogen Peroxide in the developer, where 10 Volume is equal to 3% Hydrogen Peroxide, 20 Volume is equal to 6% Hydrogen Peroxide, 30 Volume is equal to 9% Hydrogen Peroxide, and 40 Volume is equal to 12% Hydrogen Peroxide. As would be apparent to those skilled in the art, a 10 Volume developer will provide "1 level of lift", whereas a 40 Volume developer will provide "4 levels of lift". Bleach may be added to the developer to promote lifting.

Variability in the color products is only one of the variables that must be considered. Additionally, the application type (i.e. virgin, retouch, foil, etc.) must be considered. The application type that is being used will vary the processing steps involved. It may alter, for example, the time the product is exposed to the hair. Additionally, previous coloring of hair can complicate the re-coloring process, as previous haircolor as well as the natural haircolor must be taken into consideration.

The stylist must typically formulate a haircolor formula using a mixture of two or more of the above mentioned formula elements in order to change hair from a first to a second color. Given the aforementioned complexities, the sheer number of possible formulas is staggering. Before the advent of the applicants' invention, stylists were only able to generate quality formulas after obtaining years of experience working with one specific color line.

As is apparent, the haircoloring process is extremely complex. There has been a long felt need in the trade to simplify this difficult process. In an attempt to address the issue, the various color lines have published general instructions to attempt to guide the hair stylist through this complicated and error prone process. For example, MATRIX® distributes swatches of hair for their SOCOLOR® color line as examples of various colors. MATRIX® SOCOLOR® provides 11 samples of "neutral" colors (i.e. natural haircolors) and designates them as colors 1 to 11. MATRIX® SOCOLOR® further provides swatches of hair that have been treated with various colored pigments, in order to show the various target colors that the color line provides. A hair stylist can match the client's natural haircolor with one of the 11 colors provided by MATRIX® SOCOLOR®. Then a target color is selected. The stylist further estimates the percentage of gray in the client's hair. Then, based on experience, the hair stylist will custom formulate a haircolor mixture (using the products provided by MATRIX®) based on combinations of the four basic haircolor formula elements. Additionally, based on the experience of the stylist, further steps may be added (prelightening or toning) to fine tune the haircolor. Clearly, if a different color line were used (i.e. not MATRIX®) then the past experience of the stylist would be of limited value. For example, a different color line may utilize more or less than 11 colors of natural haircolor as well as different target colors. The quality of the resulting haircolor is therefore highly dependent on the experience of the stylist. Frequently experienced hair stylists consult with junior hair stylists and maintain their own notes regarding formulas, process times, steps, client history, and the like. The success of the haircolor formula is therefore highly dependent on the experience and skill of a stylist, making the haircoloring process highly subjective, error prone, and stylist specific. It would be desirous to diminish the dependency of the formula process on the experience of a stylist and specific color line, in order to create a knowledge base that results in consistent and predictable haircoloring results for each client. A computer implemented method and system for determining haircolor could greatly assist both the beginner as well as the experienced hair stylist.

It is an object of the present invention to provide a computer based method and system for accurately determining haircolor. It is another object of the present invention to provide a computer based method and system for accurately determining haircolor that interfaces with a salon management software package. It is another object of the present invention to provide a computer based method and system for accurately determining haircolor that is highly portable. It is yet another object of the present invention to provide a computer based method and system for accurately determining haircolor that can be updated and modified through interaction with a Web site. It is another object of the present invention to provide a computer based method and system for accurately determining haircolor that uses a color scanning instrument to determine initial haircolor.

BRIEF SUMMARY OF THE INVENTION

In accordance with the present invention, there is provided a computer implemented method and system for creating a haircolor formula comprising the steps of determining an initial haircolor and state of hair, identifying a target haircolor, inputting this information into a haircolor formulating software algorithm, accessing a database of haircolor formulas using the haircolor formulating software algorithm, and outputting at least one haircolor formula for achieving the target haircolor.

The foregoing paragraph has been provided by way of introduction, and is not intended to limit the scope of the following claims.

BRIEF DESCRIPTION OF THE DRAWINGS

The invention will be described by reference to the following drawings, in which like numerals refer to like elements, and in which:

FIG. 5 is a sample of a haircolor formula database;

Figure 1:
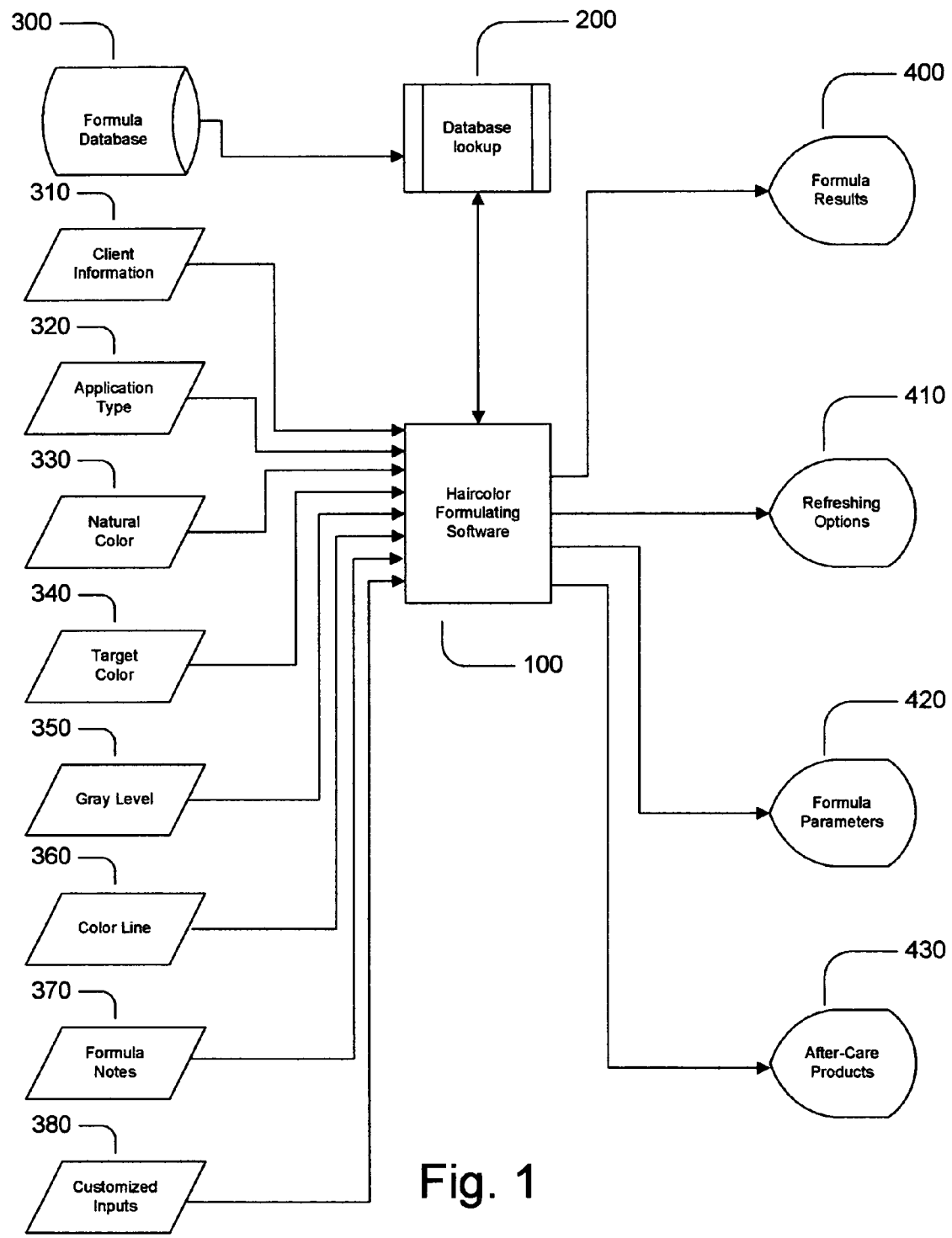
FIG. 1 is a data flow diagram according to one embodiment of the present invention.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by the appended claims.

DESCRIPTION OF THE PREFERRED EMBODIMENTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

For a general understanding of the present invention, reference is made to the drawings. In the drawings, like reference numerals have been used throughout to designate identical elements.

A computer implemented method and system for formulating haircolor is described. In the following description, for the purposes of explanation, numerous software functional blocks are described. The present invention may be practiced with all or only some of these functional blocks. The functional blocks may, in some embodiments, represent data sources that are manually input, or may be provided by way of a peripheral device or data source.

Information related to the initial haircolor and state of hair and the desired or target color of hair is entered into a haircolor formulating software algorithm. A database contains haircolor formulas for changing an initial haircolor and state of hair to a target color of hair. This specification describes the process by which an accurate target haircolor is achieved through the use of a haircolor formulating software algorithm and a database, and a system that provides such haircolor formulas. In some embodiments, said system is portable.

Referring to FIG. 1, a data flow diagram is depicted. The data flow diagram depicts the various data sources that are used by the haircolor formulating software 100 to produce useful outputs. Said haircolor formulating software 100 may, in some embodiments of the present invention, contain an integrated database or data structure. In other embodiments of the present invention, said haircolor formulating software 100 is operatively coupled to a formula database 300 using a database lookup function 200. The formula database 300 contains haircolor formulas for changing an initial haircolor and state of hair to a target haircolor. The haircolor formulas contained in the formula database 300 are haircolor formulas that have been developed and proven by experienced hair stylists, and are frequently modified to meet the specific needs of a client or are haircolor formulas that are improved and otherwise modified by an expert hair stylist. The haircolor formulas contained in the formula database 300 may, in some embodiments of the present invention, be updated, changed, and improved upon. The continual improvement and refinement of the haircolor formulas contained in the formula database 300 creates a so-called "expert system" or knowledge base that can exceed the knowledge and skill level of an individual expert hair stylist. As will be described later in this specification, the updating of the haircolor formulas contained in the database 300 can be performed, in some embodiments of the present invention, through interaction with a Web site.

Returning to FIG. 1, various data sources are used by the haircolor formulating software 100 to determine the optimal haircolor formulas and process steps required to meet a specific target haircolor. The various inputs required by the haircolor formulating software 100 are described in further detail below. The connectivity between input, software, database, and output may, in some embodiments of the present invention, be implemented through a local computing device. A local computing device may be any appliance that contains a processor and memory, such as a pocket computer, a mobile computer, a handheld computer, a palmtop, a personal computer, laptop computer, desktop computer, tablet computer, or the like. In other embodiments of the present invention, the connectivity may be implemented through a distributed network. A distributed network may include connectivity between two or more local computing devices, such as the Internet, a Web site or series of Web sites, or a private or public network.

In one embodiment of the invention, client information 310 is entered through a user interface such as a graphical user interface (GUI) that is commonly known to one skilled in the art. The client information 310 contains personally identifiable information about the client such as name, address, telephone numbers, past haircolor formulas used, information related to a client's hair attributes and properties, and other information that may be necessary to the operation of a salon or other such establishment that performs or is involved with haircoloring services. This specific client information 310 may be used to assist in the formulation of haircoloring agents and processes, and may also be used for other purposes related to the operation of the haircolor related business.

Information related to the application type 320 is also entered through the user interface. Application type is a term used in the haircoloring business to refer to a specific type of haircolor application, the term is usually defined by a category such as virgin, retouch, or foil. The application type categories may be contained in a software defined list or may be entered manually or through an interface with another system or device. The application type categories may include virgin, meaning that the hair has not been colored before, retouch, meaning that the hair has been colored before and is in need of non-uniform application of haircoloring agents, and foil, meaning that streaks of color are applied to selected portions of the hair.

Information related to the natural color 330 of the hair that the haircoloring agents and processes are to be applied is also entered through the user interface. The values that are entered at the natural color 330 functional block are typically numeric or alpha-numeric values that are specific to the color line being used, and are defined by the manufacturer of the color line. The numeric or alpha-numeric value that relates to a specific natural color 330 is often times determined by the hair stylist using a color chart or a chart containing samples of hair. These charts are frequently provided by the manufacturer of the haircoloring products. In another embodiment of the present invention, a calorimeter, spectrophotometer, or scanner is used to determine the numeric or alpha-numeric value that relates to a specific natural color 330. An example of such a device is the Minolta® CR300 Colorimeter.

Information related to the target color 340 that is desired by the client is entered through the user interface. The values that are entered at the target color 340 functional block are typically numeric or alpha-numeric values that are specific to the color line being used, and are defined by the manufacturer of the color line. The numeric or alpha-numeric value that relates to a target color 340 is oftentimes determined by the hair stylist using a color chart or a chart containing samples of hair. These charts are frequently provided by the manufacturer of the haircoloring products. In another embodiment of the present invention, a color chart or color samples are presented on a computer display. In some embodiments of the present invention, a digital photograph or digital video of the client is modified to illustrate visually what a certain target haircolor 340 would look like. Techniques to modify digital images on a computer are commonly known to those skilled in the art. The alpha-numeric values related to the target haircolor 340 may also be entered manually or may be contained in a database such as the haircolor formulas database 300, an external database, or another data source.

Information related to the gray level 350 that predominates the existing hair is entered through the user interface. The values that are entered at the gray level 350 functional block are typically expressed as a percentage of gray to non-gray hair. The percentages may be expressed as a fixed value or as a range, such as less than 50% gray, more than 50% gray, or as other ranges of values that may be required for the proper formulation of the coloring agents and the process steps.

In some embodiments of the present invention, the stylist has the option of specifying the color line 360 to be used in the haircolor formula determination. The color line 360 is specific to a manufacturer. The selection of color line is entered through the user interface. In other embodiments of the present invention, the choice of color line 360 is not available to the stylist. In other embodiments of the present invention, the haircolor formulating software 100 selects the color line 360 based on the input selections 310, 320, 330, 340 and 350.

Formula notes 370 may also be presented to the stylist through the user interface. The formula notes 370 may contain information from the manufacturer about a specific haircoloring product, process or formula. In other embodiments of the present invention, the formula notes 370 may contain information from another stylist or haircolor professional about a specific haircoloring product, process, or formula. In other embodiments of the present invention, the formula notes 370 may contain information from a stylist or a client.

At times, it may be desirable to modify and customize the formulas that are provided through the haircolor formulating software 100. These modifications and customizations are at times required by the stylist. In some embodiments of the present invention, customized inputs 380 may be entered through the user interface. These customized inputs may include the hair texture, hair tenacity, hair porosity, hair form, hair length, and the like. Using the data entered through functional blocks 310, 320, 330, 340, 350, 360, 370 and 380, the haircolor formulating software 100 formats the data entry into a database query or database lookup 200 against the formula database 300. The interaction between the haircolor formulating software 100 and the formula database 300 is further described later in this specification by way of FIG. 8 and the related description of the four-tier software development model used in one embodiment of the present invention. The outcome of the database query or database lookup 200 are data output results that can be used by the hair stylist or another professional to perform the haircoloring process in such a way that the expected outcome is achieved as specified by the target color functional block 340.

The haircolor formulating software 100 may, in some embodiments of the present invention, be contained on the same media that the formula database 300 is stored. Such media may be a hard (magnetic) disk, a compact disk, an optical disk, a floppy disk, magnetic tape memory, non-volatile memory, volatile memory, random access memory, read-only memory, optical memory, and the like. In other embodiments of the present invention, the haircolor formulating software 100 may reside on media that is separate from the media that stores the formula database 300. Connectivity between the haircolor formulating software 100 and the formula database 300 may be through a wide area network, a local area network, a wireless network, an optical network, the Internet, an intranet, or another form of networking known to one skilled in the art.

The formula database 300 may, in some embodiments of the present invention, be encrypted, or may contain security features to prevent the unauthorized copying or accessing of the haircolor formulas contained in the formula database 300.

The data output results of the database query or database lookup 200 are provided in functional blocks 400, 410 and 420, as further defined below.

In functional block 400, formula results, the formula of the coloring agents is provided through an output device such as a printer or a graphical user interface (GUI), as is commonly known to one skilled in the art. The formula contains information such as the volume or mass of each constituent coloring agent that must be combined to achieve the desired target color. The formula results functional block 400 also contains a description of the number of steps required in the application of the coloring agents, the time of application of the coloring agents, and other information that may be useful or required by the hair stylist.

In functional block 410, refreshing options, one or more haircoloring chemical compositions are specified. The term refreshing options is used in the business of haircoloring to refer to a process for treating and correcting ends of colored hair that have changed color or faded over time. The haircoloring chemical compositions contained under the refreshing options functional block 410 are typically used for the treatment and correction of faded ends of hair that have changed color from a previous application of haircoloring agents. The refreshing options 410 are provided through an output device such as a printer or a graphical user interface (GUI).

In functional block 420, formula parameters, summary information of the data from functional blocks 310 client information, 320 application type, 330 natural color, 340 target color, 350 gray level, 360 color line, 370 formula notes, and 380 customized inputs are provided through the output device. The formula parameters 420 information provides the hair stylist or other professional with the information that was used by the software to determine the formula results 400 and refreshing options 410. The formula parameters 420 are provided through the output device.

In functional block 430, after-care products, a listing of suggested products such as shampoo, conditioner and styling products is provided through the output device such as a printer or a graphical user interface (GUI), as is commonly known to one skilled in the art. The listing of suggested products is determined in part by manufacturer and stylist recommendations that are contained in the formula database 300, and are often dependent on the color line 360.

Figure 2:
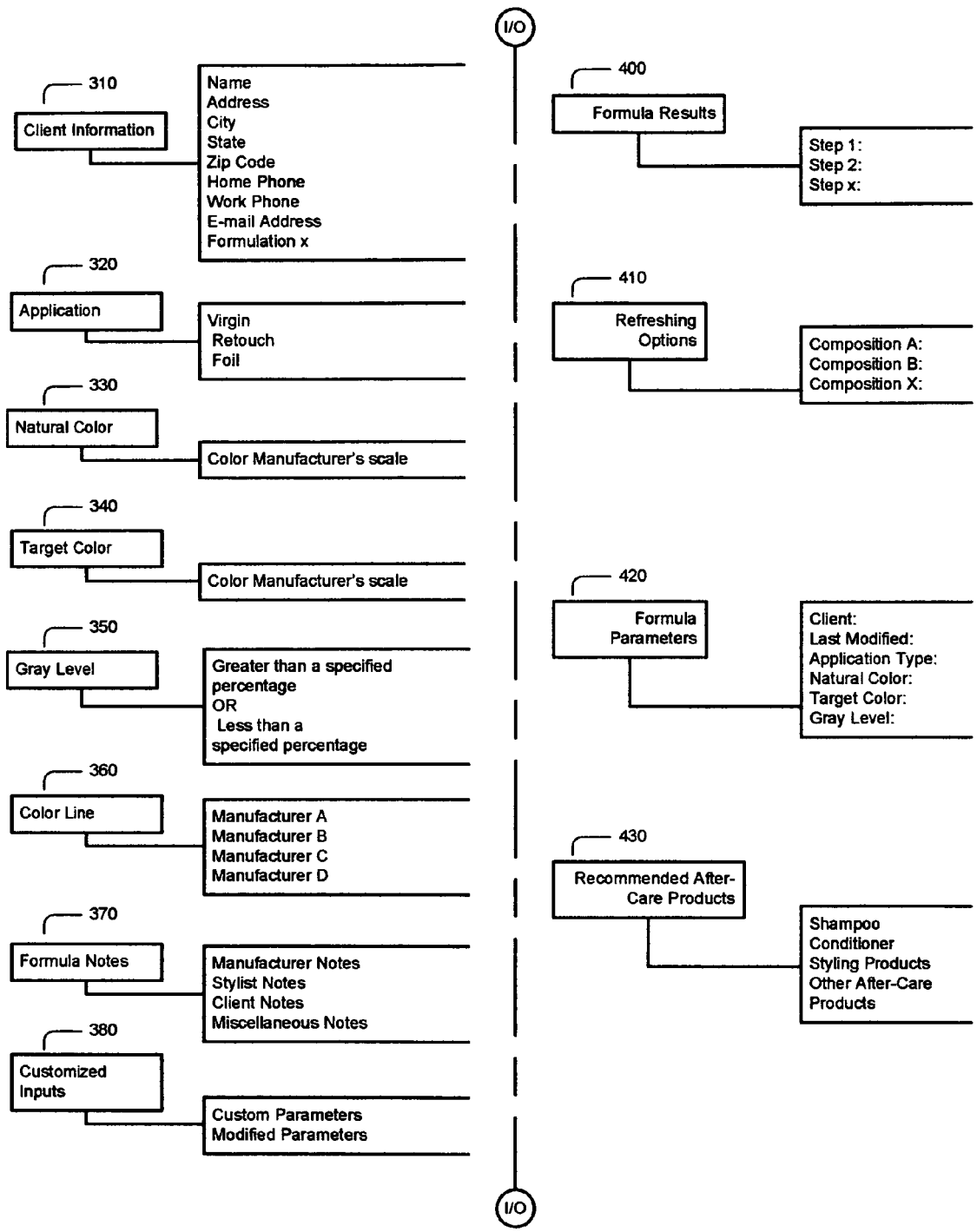
FIG. 2 is a data input output diagram according to one embodiment of the present invention.

Referring to FIG. 2, a data input output diagram is use shown. The left side of the diagram shows data that must be entered such that the haircolor formulating software 100 and formula database 300 can properly determine the haircolor formulas and process steps required to meet a specific target haircolor. The numbers correspond to the numbers of the functional blocks contained in FIG. 1. The sources of the input data on the left side of the diagram may be manual entry, another data source such as an electronic file or a database, or data output from a peripheral device such as a haircolor scanning device. The right side of the diagram shows data that is provided by the haircolor formulating software, using both the input data shown on the left side of the diagram as well as data contained in the haircolor formula database.

Figure 3:
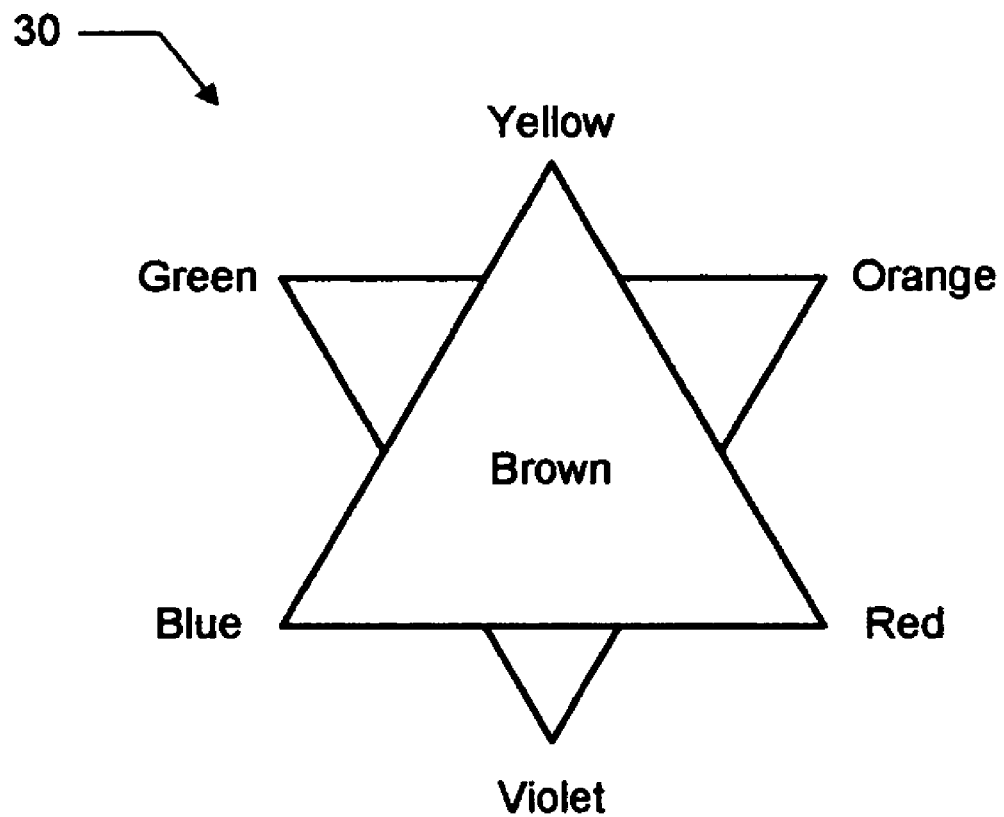
FIG. 3 is a color star diagram.

Referring now to FIG. 3, a color star diagram 30 is shown. As known to one skilled in the art, haircoloring follows the traditional rules of complimentary colors. The primary colors of red, yellow, and blue, and the secondary colors of orange, green, and violet are illustrated in the color star of FIG. 3. The secondary colors are mixtures of two primary colors (e.g. orange is a mixture of yellow and red). Similarly, tertiary colors can be generated by mixing a primary and a secondary color (e.g. yellow-orange (gold) which is a mixture of yellow and orange). As is apparent to one of ordinary skill in the art, one can use this color star 30 to identify complimentary (i.e. counteracting) colors to shift the color of hair. To neutralize a given shade, one treats with that shade's complimentary color. Thus, by way of illustration, to remove red, one applies a green dye. The color star 30 forms the underlying basis for haircolor formulating. The color star 30 is used by many manufacturers to provide haircolor products and formula guidance. The haircolor formulating software 100 combines the manufacturer's product information and formula guidance with a knowledge base gained through actual field experience by hair stylists and professionals to improve the accuracy and quality of the haircoloring process.

Figure 4:
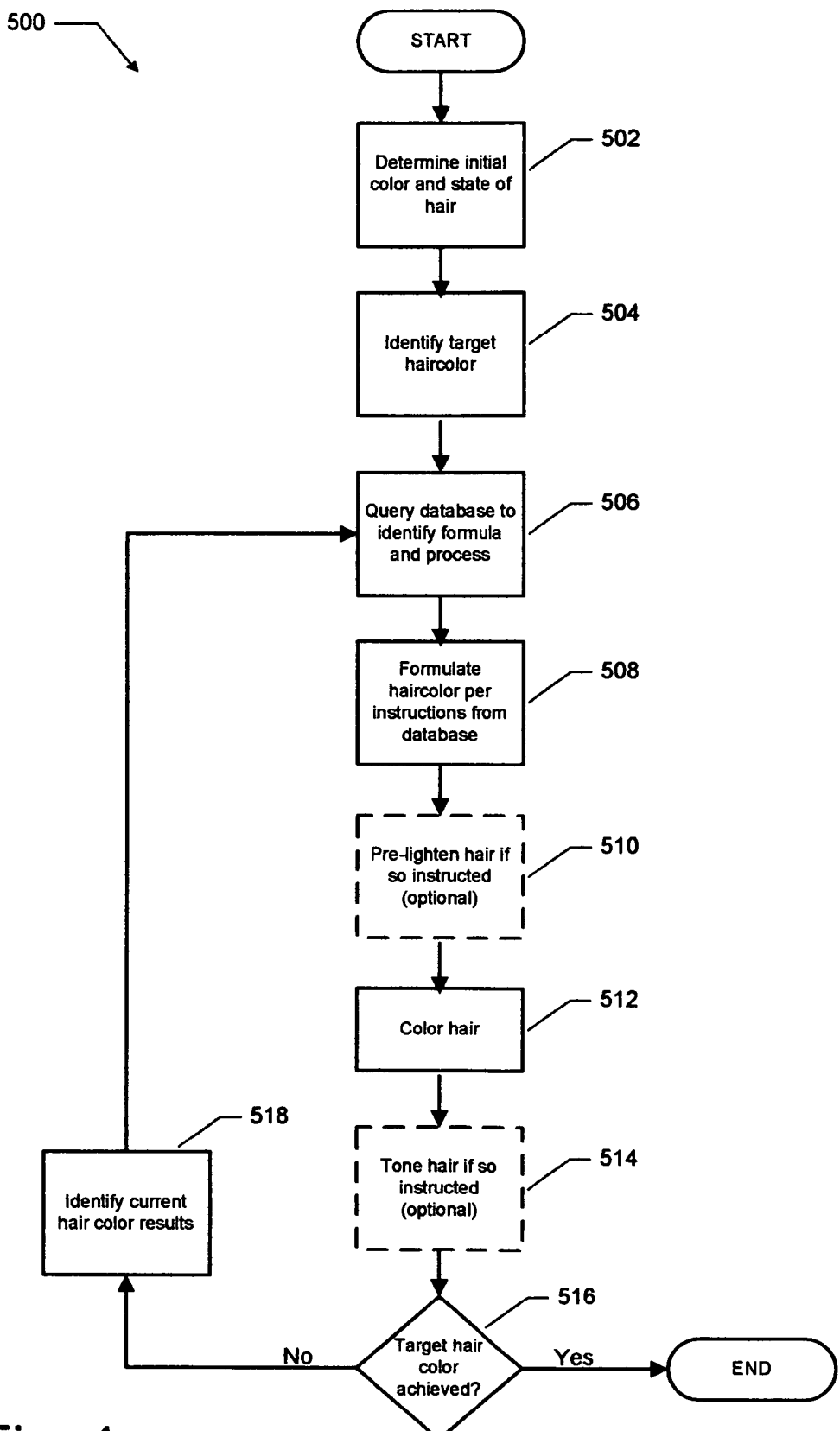
FIG. 4 is a process diagram according to one embodiment of the present invention.

Referring now to FIG. 4, a process diagram of one process 500 of the invention is shown. In step 502 of the process 500, the initial color and state of the hair is determined. In one embodiment, the initial color and state comprises the factors of current haircolor and condition of the hair. In another embodiment, the initial condition comprises the factors of current haircolor and percentage of gray hair. In another embodiment, the initial condition comprises the factors of current haircolor and natural haircolor. In another embodiment, the initial condition comprises the factors of current haircolor and hair texture. Hair texture is the diameter of an individual hair strand, and is generally described as fine, medium, or coarse. In one embodiment, this condition is correlated to the list of conditions provided by known commercial colors lines. By way of illustration, and not limitation, should the MATRIX® SOCOLOR® color line be used, the initial condition would, in one embodiment, comprise the natural color (1 to 11), the percentage of gray, application type, and the target color. In another embodiment, a picture of the initial condition is displayed on a computer screen (for example on a personal digital assistant or Web page). In another embodiment, text which describes the initial condition is displayed.

In step 504 of the process 500, the target haircolor is selected. In one embodiment, this target haircolor is correlated to the colors provided by a commercial color line. In another embodiment, a picture of the target color is displayed on a computer screen (for example on a personal digital assistant or web page). In another embodiment, text that describes the target color is displayed.

In step 506 of the process 500, a query is made of a database which comprises haircolor formulas for one or more color lines. As will be apparent to one of ordinary skill in the art, this database is constructed so as to incorporate the experience of one highly skilled in the art of haircoloring. By utilizing the vast knowledge contained within this database, a novice in the art will be able to produce a haircolor formula with greater accuracy and quality. In one embodiment, this database comprises formula data for one color line. In another embodiment, this database comprises processing steps for using formula data (i.e. application times, etc.). In yet another embodiment, the database comprises both formula data and processing steps. In another embodiment, this database comprises formula data and/or processing steps for multiple color lines. The formula data returned from the database may comprise a single coloring step and/or formula. Alternatively, or additionally, the formula data returned from the database may comprise a coloring step and formula, a pre-lighting step and formula, a toning step and formula, and combinations thereof. Thus, the database provides one with detailed instructions for the formulation of haircolors as well as the use of haircolors to convert hair of an initial color to hair of a target color.

By way of illustration and not limitation, a database that describes various MATRIX® SOCOLOR® formulas may be used. If the initial haircolor was MATRIX® SOCOLOR® designation "6" (a shade of light brown), the application type was a "virgin" application, and the desired target color was MATRIX® SOCOLOR® designation "7CG" (a shade of copper gold), with a gray level of less than 50%, the database would respond by providing a single coloring step with a formula of 2 oz. of haircolor 7CG plus 2 oz. of 20 Volume developer for 30-45 minutes. A similar color change using a "retouch" application, rather than a virgin application, would result in 1.5 oz. 7CG haircolor plus 1.5 oz. 10 Volume developer for 30-45 minutes. If an alternative color line were employed, instructions for the same color change could be given using the different manufacturer's products.

By way of further illustration, if the initial haircolor was MATRIX® SOCOLOR® designation "1" (a shade of black), a "virgin" application, the target color was MATRIX® SOCOLOR® designation "7CG" (a shade of copper gold) with a gray level of less than 50%, the database would respond by providing two steps: firstly pre-lighten by treating with a formula comprising 2 oz. bleach, and 4 oz. of 20 Volume developer for 30-45 minutes followed by a toning step of treating the hair with a formula of 2 oz. 7CG dye plus 2 oz. of 10 Volume developer for 20-30 minutes.

In step 508 of process 500, the hair stylist formulates the mixtures and applies the formula to the hair in compliance with the instructions from the database in step 506. In step 510, which is optional, the hair is pre-lightened. This step is utilized only if the database indicates a pre-lightening step should be employed. In step 512, the coloring formula, which was generated in step 508, is applied to the hair in compliance with the instructions from the database. In step 514, which is optional, the hair is toned. This step is utilized only if the database indicates a toning step should be employed.

In step 516 of process 500, a comparison is made of the color achieved versus the target color of step 504. If the target haircolor is achieved, the process ends. If the target haircolor is not achieved, the now current haircolor is determined in step 518, and the process returns to step 506 (the process loop) where the database is queried to identify a formula and process that is unique to the now current haircolor and the target haircolor. In one embodiment, the process loop is repeated to correct for any discrepancies between the achieved and the target color. In another embodiment, the process loop is not repeated, but lesser corrective measures are taken.

Referring now to FIG. 5, a sample of a haircolor formula database is provided. The sample database listing of FIG. 5 represents a small illustration of the contents of the formula database 300, and is provided by way of example, and not limitation. The sample database listing of FIG. 5 illustrates various haircolor formulas to be used for various natural color levels (1-11 in the sample listing). The gray level 350 that has been selected in this example is less than 50%. The application type 320 that has been selected in this example is virgin retouch. For each of the natural color levels provided in the database listing, a haircolor formula and application times are provided. These haircolor formulas and times are specific to each haircolor manufacturer, and may include modifications and improvements thereof.

Figure 6:
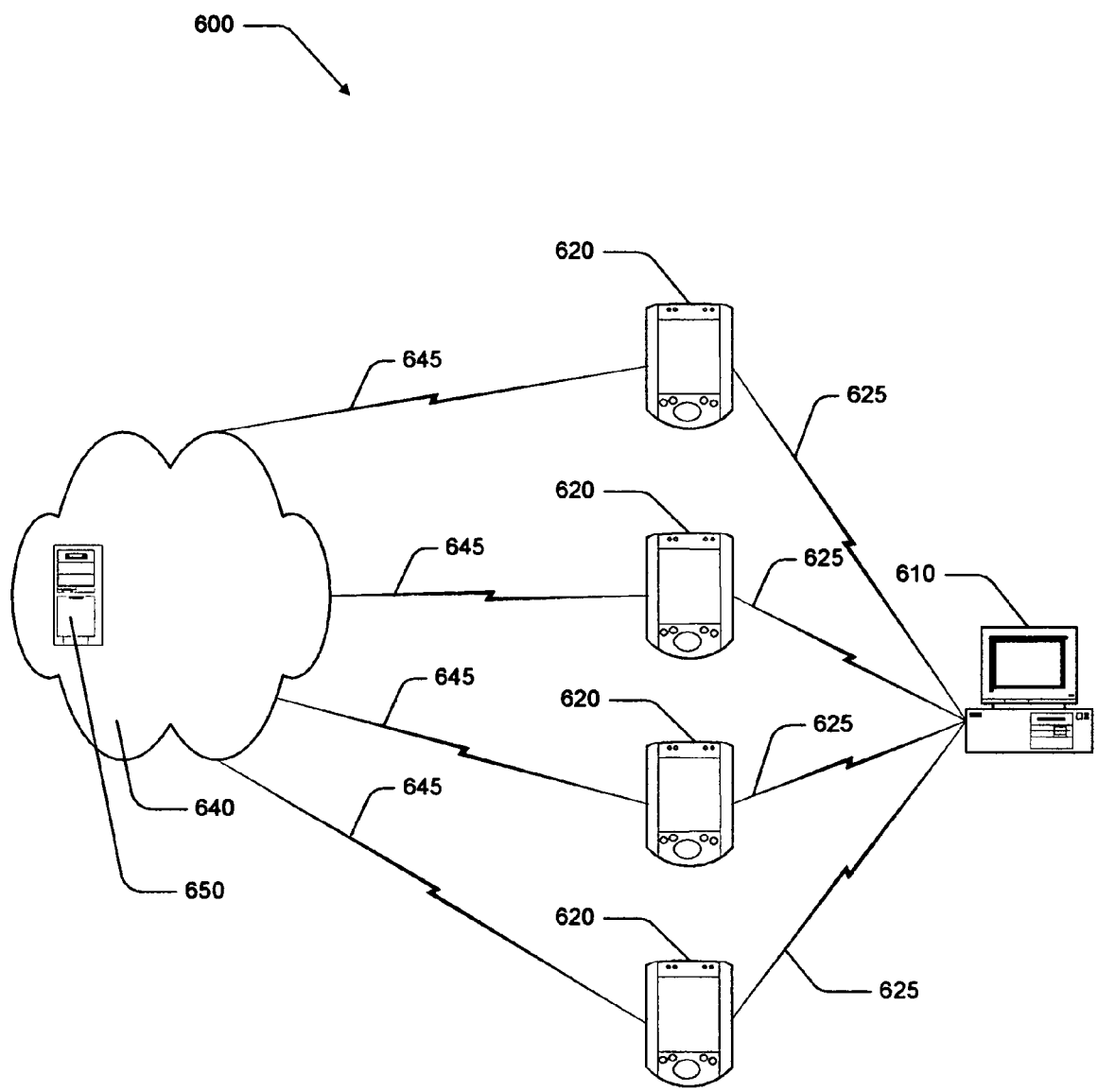
FIG. 6 is a network diagram depicting the various components of a system for formulating haircolor.

Referring now to FIG. 6, a network diagram 600 depicting various components of a system for formulating haircolor is illustrated. Various embodiments of the present invention may use some or all of the components depicted in the network diagram 600. Other components may be added or substituted as would be apparent to those skilled in the art.

Referring also to FIGS. 1 and 2, the haircolor formulating software 100 may, in some embodiments, reside on a portable computing device 620 such as a pocket computer, a mobile computer, a handheld computer, a palmtop, a personal computer, laptop computer, tablet computer, or the like. In some embodiments, the portable computing device 620 may further include the formula database 300. In some embodiments of the present invention, the portable computing device 620 is wirelessly connected to a salon computer 610. The salon computer 610 may, in some embodiments, contain the haircolor formulating software 100, and may also, in some embodiments, contain the formula database 300. The salon computer 610 may, in some embodiments, contain salon management software (not shown) and other software programs (not shown) that may be useful to the stylist. In some embodiments of the present invention, the haircolor formulating software 100 is integrated with the salon management software through a common data set and interface (not shown). The software functional blocks and associated data elements output by the haircolor formulating software 100, such as the formula results 400, refreshing options 410, formula parameters 420, and after-care products 430 may, in some embodiments, be provided to the salon management software through an electronic interface. In some embodiments, the data inputs to the haircolor formulating software 100 such as client information 310, application type 320, natural color 330, target color 340, gray level 350, color line 360, formula notes 370, and customized inputs 380 may be contained in an electronic interface between the salon management software and the haircolor formulating software 100.

The portable computing devices 620 may, in some embodiments, be wirelessly connected to the Internet 640 through a communications link 645. In some embodiments of the present invention, the formula database 300, and/or the haircolor formulating software 100 can be updated, modified, and added to through interaction with a Web server 650. The Web server 650 may contain additional haircolor formulas, improved haircolor formulas, manufacturer notes, stylist notes, client information, and the like.

Figure 7:
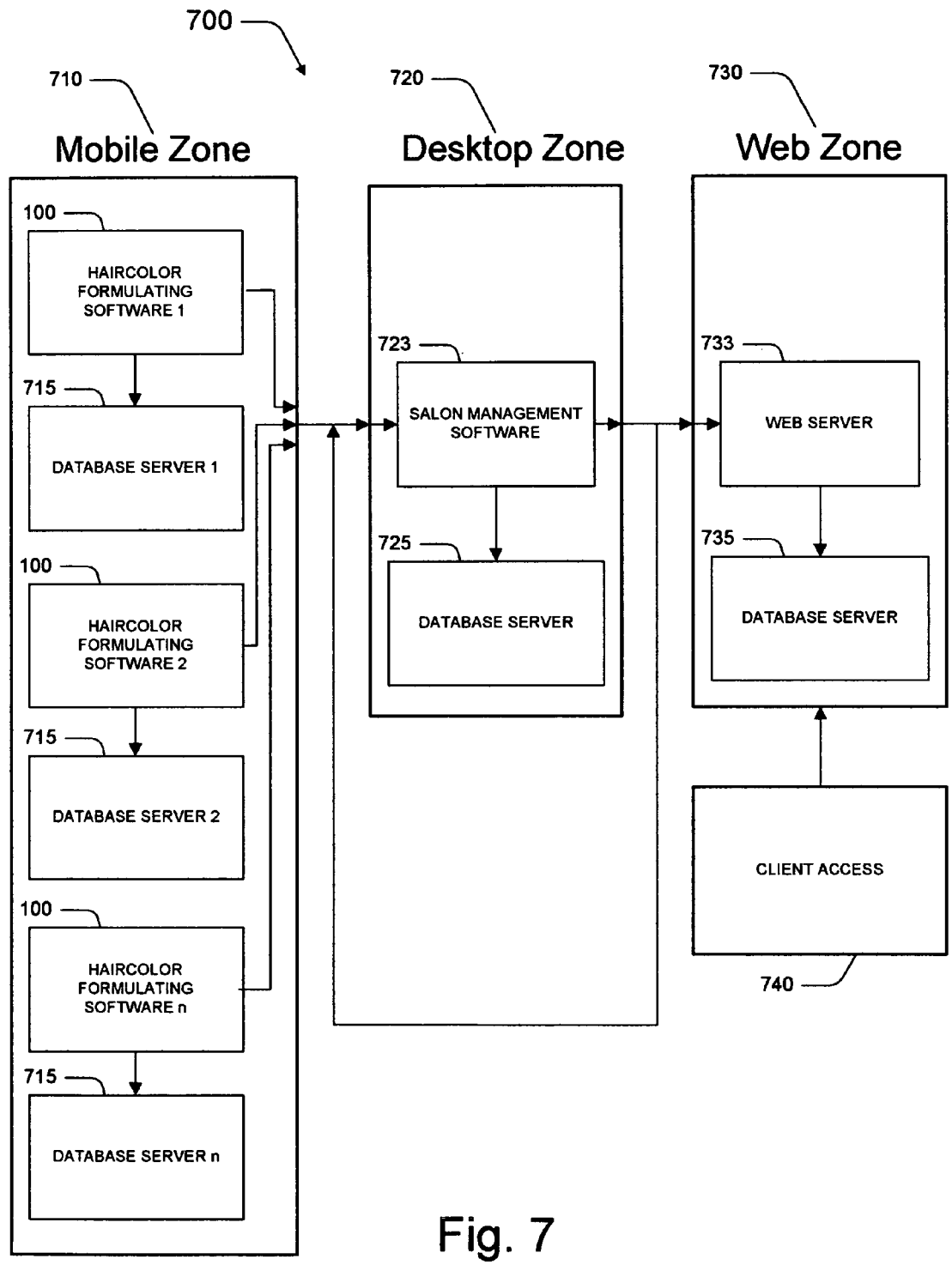
FIG. 7 is a software network diagram.

Turning now to FIG. 7, a software network diagram is illustrated that portrays the location and interaction of the software elements that reside in the network elements that have been previously described by way of FIG. 6. For the sake of clarity, the terms Mobile Zone 710, Desktop Zone 720, and Web Zone 730 will be used to further describe the software network diagram 700. The Mobile Zone 710 contains the portable computing devices 620 of FIG. 6. Each portable computing device 620 contains haircolor formulating software 100 and, in some embodiments, a database server 715 that contains the formula database 300. The haircolor formulating software 100 can, in some embodiments, connect to salon management software 723. The salon management software resides on a salon computer 610. The salon computer 610 may further contain a database server 725, and in some embodiments, haircolor formulating software 100. The salon computer 610 is contained in the Desktop Zone 720. In some embodiments of the present invention, the Mobile Zone 710 and the Desktop Zone 720 are connected to the Web Zone 730 using internet connectivity protocols that are known to those skilled in the art. The Web Zone 730 contains a Web server 733 and, in some embodiments, a database server 735. The Web Zone 730 can be accessed by stylists and other professionals and also, in some embodiments, the Web Zone 730 can be provisioned with client (i.e. customer) access 740.

Figure 8:
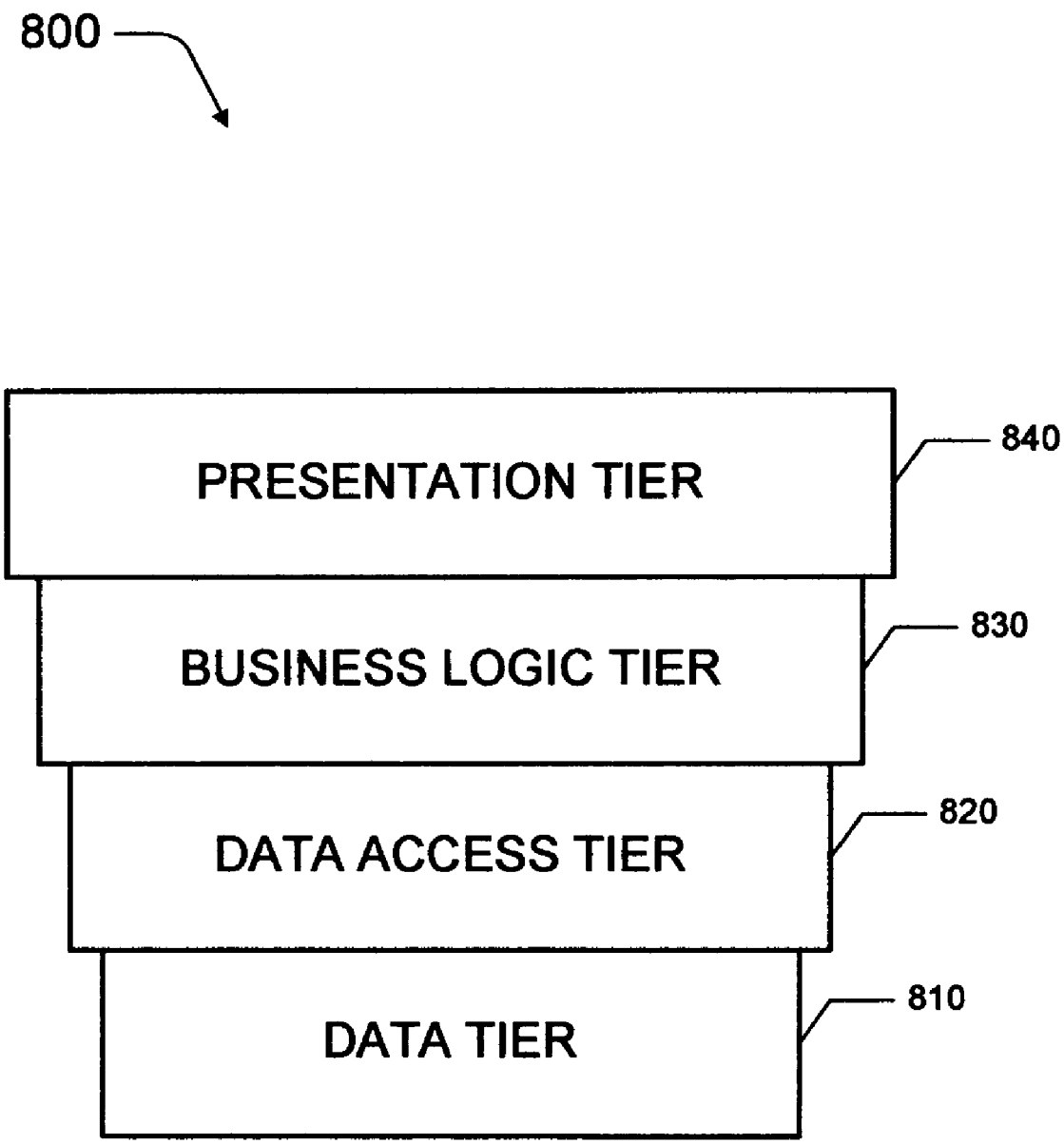
FIG. 8 is a diagram of a 4-tier software development model.

The haircolor formulating software 100, in one embodiment, uses a four-tier software development model. Other software development models may be used to accommodate changing technologies, and are not intended to limit the spirit and broad scope of the invention as defined by the attached claims. FIG. 8 is a diagram of a four-tier software development model 800 that is used in one embodiment of the present invention.

The lowest tier, the data tier 810 is a Database Management System (DBMS). Examples of a database management system include Microsoft® SQL Server®, Oracle®, MySQL®, and the like. Various versions of a chosen database management system may be used to accommodate different local computing devices. The data tier 810 deals with the storage and retrieval of information, and is not concerned with how data is delivered or manipulated.

The second tier, the data access tier 820 contains software and algorithms to interact with database data that is contained in the data tier 810. The data access tier 820 contains software and algorithms to read and write data from and to a database, such as the formula database 300. The data access tier 820 contains no data manipulation or transformation logic.

The third tier, the business logic tier 830 contains code objects that represent entities in the data tier 810. For example, if working with a client management system, the business logic tier 830 would contain a code object that represents a client, including the properties (name, birthday, address, etc.) and behaviors (make payment, receive service, etc.) of that client, along with code to validate the current state of that client object. The business logic tier 830 has no code to interact with the database in the data tier 810. The business logic tier 830 works through the data access tier 830 to store and retrieve the state of an object, such as a client.

The fourth tier, the presentation tier 840 provides the end user of an application with a user interface (UL), typically a graphical user interface (GUI). The presentation tier 840 works with the output of the business logic tier 830. The presentation tier 840 handles the transformation of the data encapsulated by an object in the business logic tier 830 into something that is readable/editable by an end user. For example, the end user could enter data to represent the properties of a client (i.e. name, birthday, address, etc.) in text boxes or request that a client perform an action (i.e. make payment) by clicking on a button.

An end user therefore interacts with the presentation tier 840, which gets object data from the business logic tier 830. The business logic tier 830 is able to save and retrieve object state data from the data tier 810 by interfacing with the data access tier 820. These four tiers exist in each of the three zones (Mobile Zone 710, Desktop Zone 720, and Web Zone 730). The data tier 810, data access tier 820, and business logic tier 830 in each of the zones are nearly identical, whereas the presentation tier 840 is different in each of the three zones to represent the different ways in which end users interact with the zone's technology implementation (e.g., handheld computer with stylus, desktop computer with keyboard and mouse, Web browser with keyboard and mouse). The use of a four-tier software development model allows for ease of software code changes (changes in code are made only in the appropriate tier instead of having to edit one monolithic source code structure), allows different software developers to work on tiers where they have the most experience, allows for changes in the implementation of a tier without affecting all other tiers. For example, the Database Management System in the data tier 810 could be changed from Microsoft®

SQL Server® to Oracle® without affecting the presentation tier 840 or the business logic tier 830. Only the data access tier 820 would need to be modified to work with Oracle® instead of Microsoft® SQL Server®. Also, the presentation tier 840 could be changed to work with different devices, computers, servers, and the like without changing the remaining three tiers.

Figure 9:
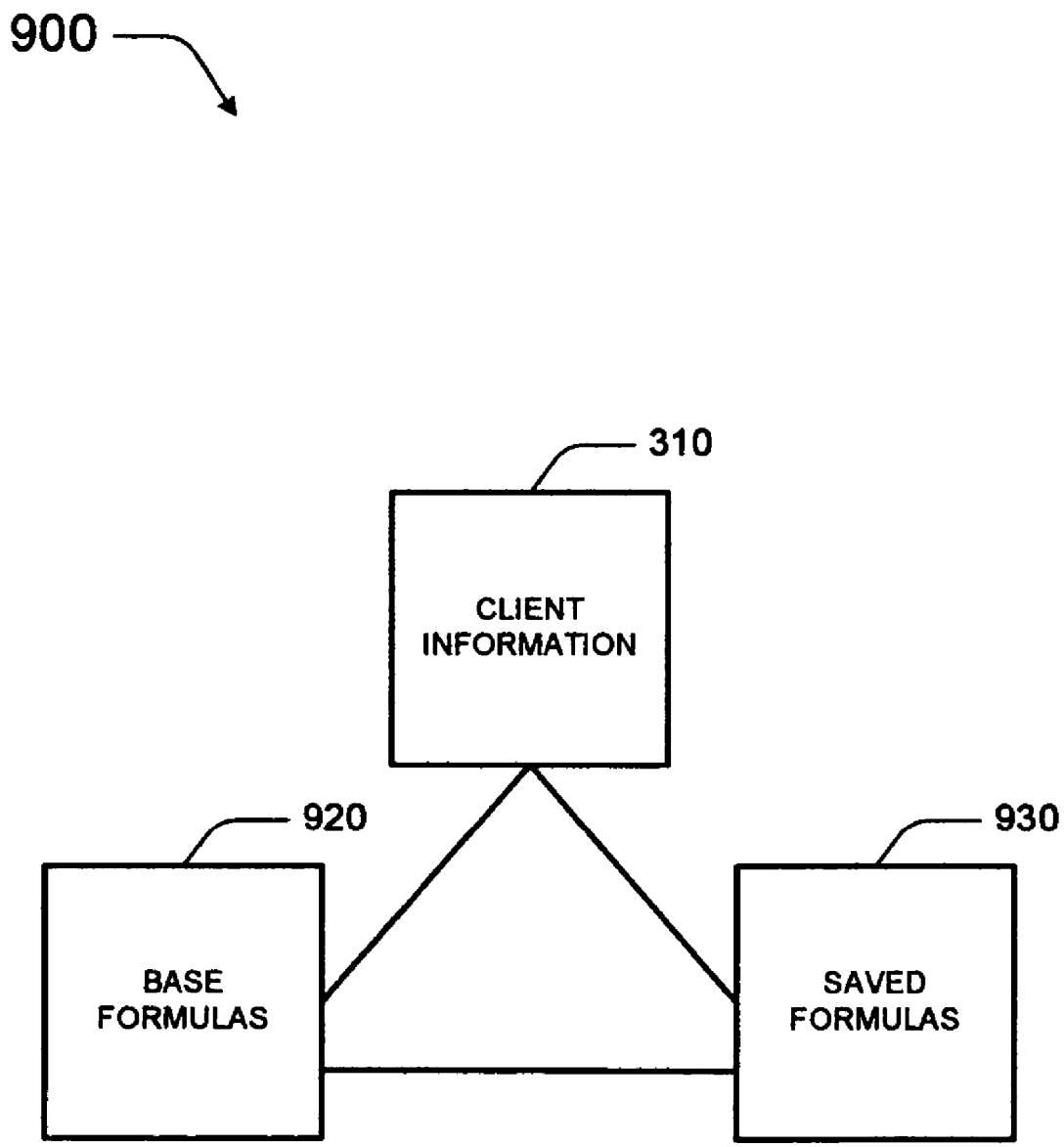
FIG. 9 is a data relationship diagram.

Referring now to FIG. 9, a data relationship diagram 900 is illustrated. Client information 310, as previously described by way of FIG. 1, in one embodiment of the present invention, further contains saved formulas 930 that have either been applied to a client's hair, or have been suggested to a client. In one embodiment of the present invention, the haircolor formulas may include modifications, customizations, and the like. These data provide historical information that can be used by a stylist to better serve a client and also, in some embodiments of the present invention, the saved formulas 930 may be used to increase and improve the knowledge base of the haircolor formula database 300. The base formulas 920 may include, in some embodiments of the present invention, haircolor formulas, as they originally appear in the haircolor formula database 300.

Figure 10:
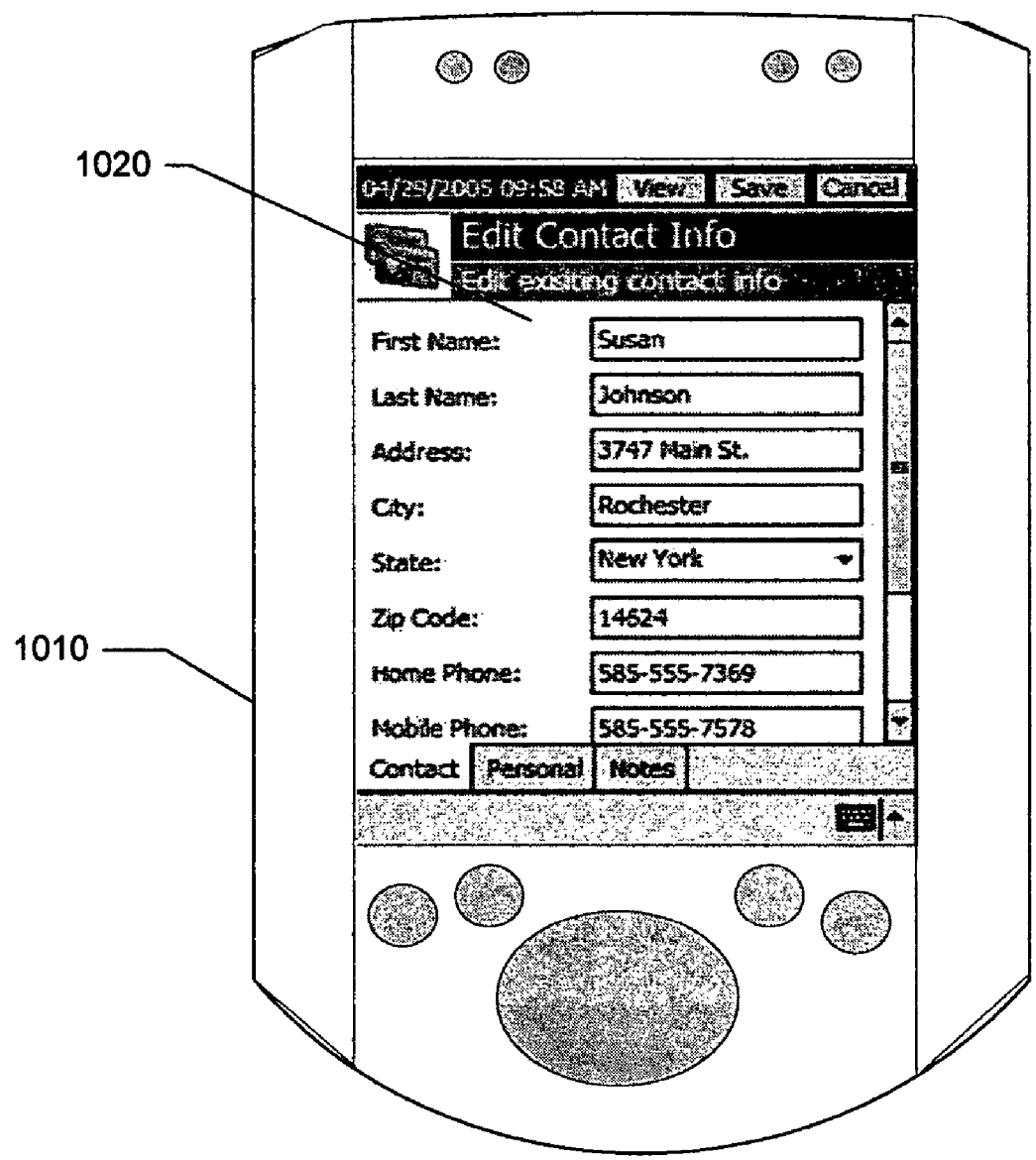
FIG. 10 is a screenshot of a client information screen according to one embodiment of the present invention.

Turning now to FIG. 10, a screenshot of a client information screen 1020 is depicted on a pocket personal computer 1010. The screenshot illustrates a graphical user interface according to one embodiment of the present invention, and shows data fields, for example, first name, last name, address, city, state, zip code, home phone, mobile phone, notes, and the like. Variations and changes to the screenshot of a client information screen 1020 may be made by one skilled in the art, and fall within the spirit and broad scope of this invention.

Figure 11:
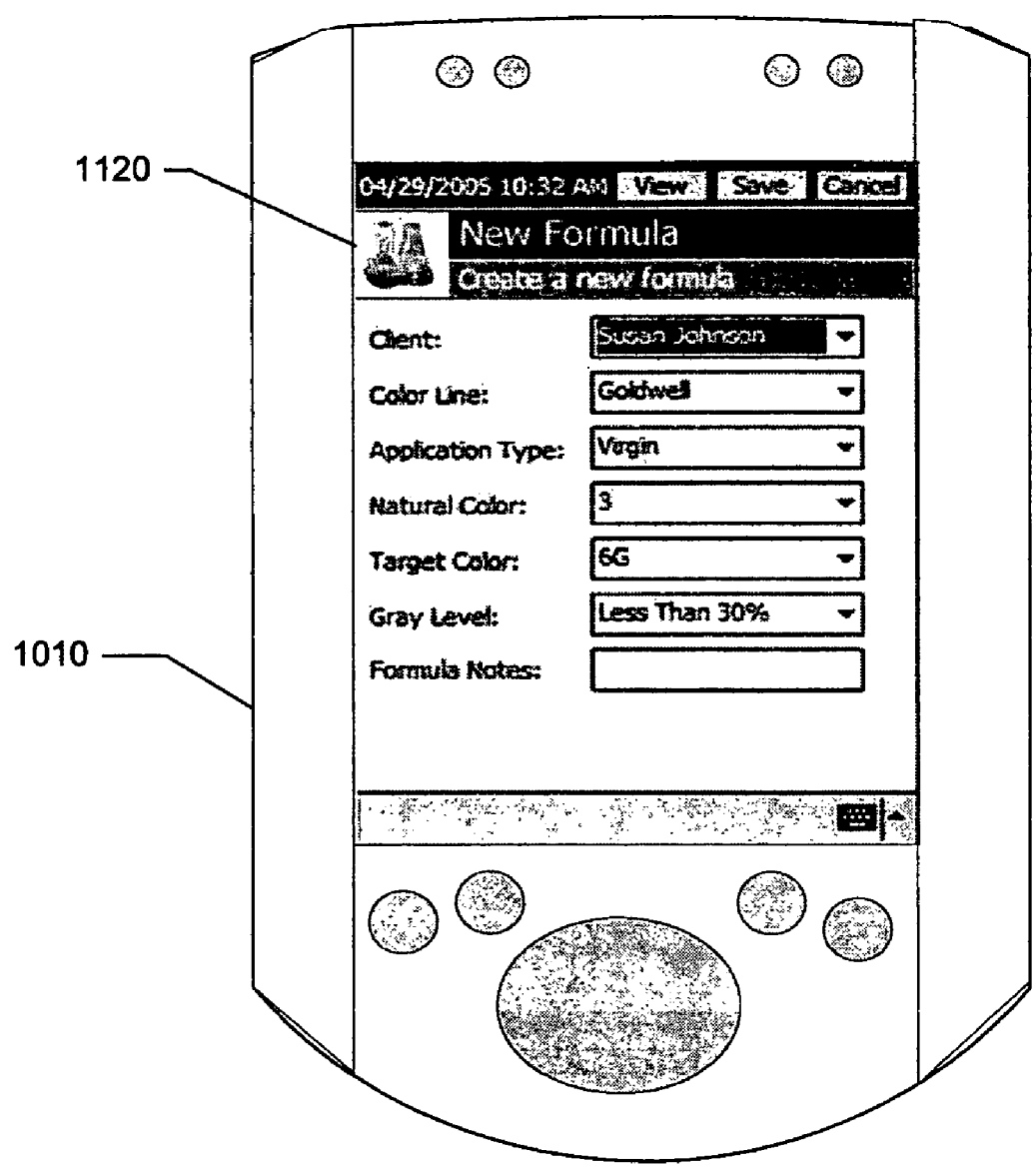
FIG. 11 is a screenshot of a formula creation screen according to one embodiment of the present invention.

Turning now to FIG. 11, a screenshot of a formula creation screen 1120 is depicted on a pocket personal computer 1010. The screenshot illustrates a graphical user interface according to one embodiment of the present invention, and shows data fields, for example, client name, color line, application type, natural color, target color, gray level, formula notes, and the like. Variations and changes to the screenshot of a formula creation screen 1120 may be made by one skilled in the art, and fall within the spirit and broad scope of this invention.

Figure 12:
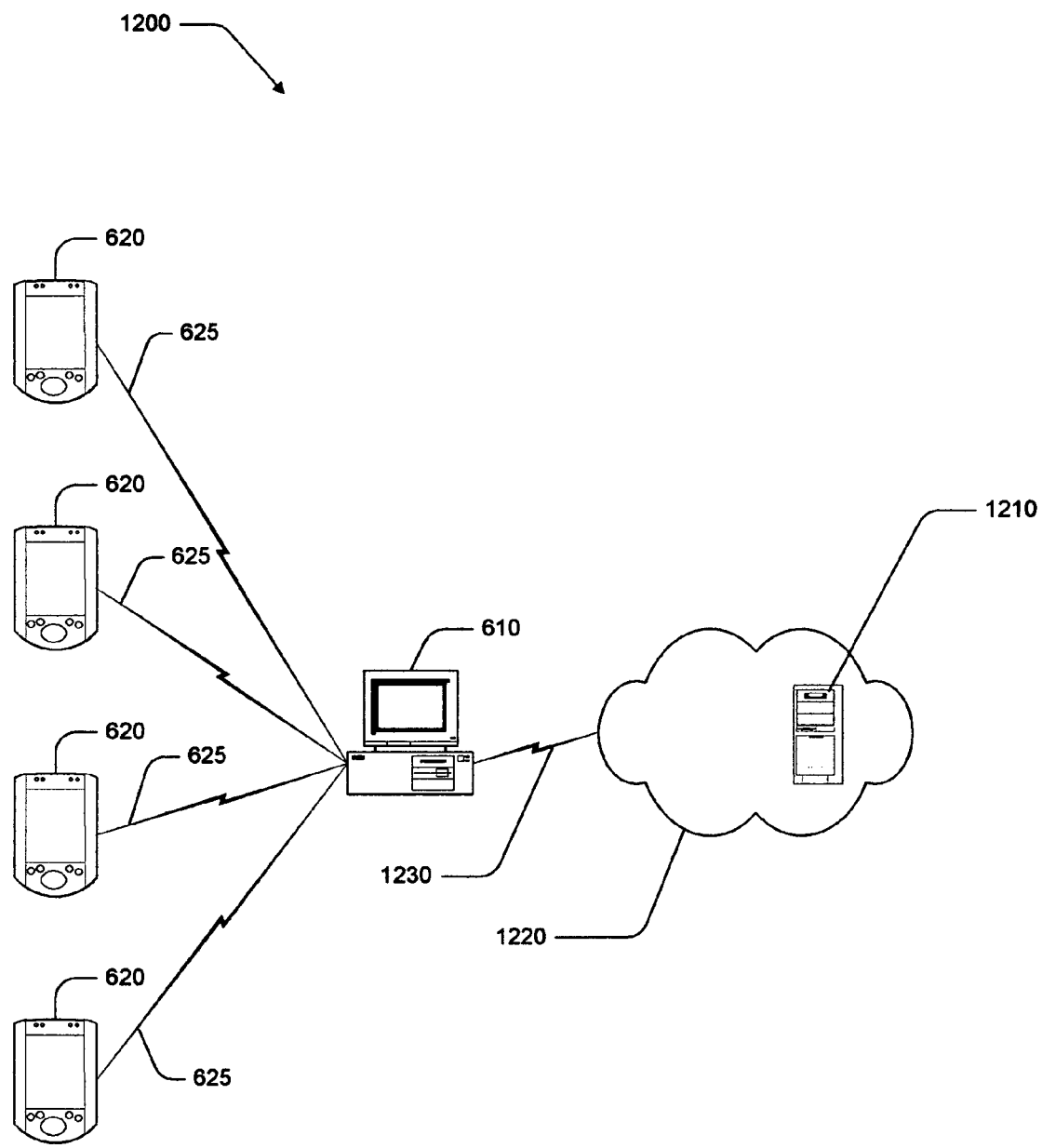
FIG. 12 is a network diagram of a hosting service according to one embodiment of the present invention.

Lastly, FIG. 12 is a network diagram that depicts a hosting service 1210 according to one embodiment of the present invention. As previously discussed by way of FIG. 6, portable computing devices 620 are, in some embodiments of the present invention, wirelessly connected to a salon computer 610. The salon computer 610 may, in some embodiments, contain the haircolor formulating software 100, and may also, in some embodiments, contain the formula database 300. The salon computer 610 may, in some embodiments, contain salon management software (not shown) and other software programs (not shown) that may be useful to the stylist. The salon computer 610 may also, in some embodiments of the present invention, be a portable computing device 620.

In some embodiments of the present invention, the salon computer 610 may be connected to the internet 1220 through a network connection 1230 such as TCP/IP, dial up, ISDN, DSL, or other means to connect to the internet that are known to those skilled in the art. A hosting service 1210 may be accessed by the salon computer by way of the internet 1220. The hosting service 1210 is an internet-based service that provides updates and services to a salon that uses the present invention. Such services may include automatic software updates, updates to various databases such as the haircolor formulas database, marketing data collection and dissemination, advertising transfers to the portable computing devices 620, marketing information transfers, and the like. Marketing information transfers may include data that has been collected by a salon such as most commonly selected hair care products, most commonly selected haircolors, and the like. Marketing information may also include information provided from the hosting service to the salon, such as hair care product merchandising techniques, promotional product information, and the like. The salon computer 610 may also contain information related to marketing, billing, inventory management, automatic mailings, and marketing statistics. The salon computer 610 may also, in some embodiments of the present invention, transfer marketing information to the hosting service 1210. The marketing information may then be used by the hosting service to determine, for example, products that the salon may wish to consider stocking. The hosting service 1210 may interact with the salon computer 610, or, in other embodiments of the present invention, may interact directly with the portable computing devices 620.

It is, therefore, apparent that there has been provided, in accordance with the various objects of the present invention, a computer implemented method and system for formulating haircolor. While the various objects of this invention have been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A computer implemented method for changing an initial haircolor to a target color of hair comprising the steps of:
   a. determining, an initial haircolor and state of hair using an optical device;
   b. identifying a target color of hair using a color chart;
   c. inputting said initial haircolor and state of hair and said target color of hair into a computer containing haircolor formulating software
   d. accessing a database on said computer using said haireolor formulating software by providing said database with said initial haircolor and state of hair and said target color of hair, wherein said database comprises formulas for changing said initial haircolor to said target color of hair;
   e. determining on said computer if said target color of hair will be achieved by analyzing a progression of color changes in hair;
   f. repeating the step of inputting said initial haircolor and state of hair and said target color of hair into a computer containing haircolor formulating software until said target color of hair is achieved; and
   g. outputting on said computer at least one haircolor formula for achieving said target color of hair based upon said initial haircolor and state of hair.

2. The method of claim 1 wherein the step for outputting at least one formula for achieving said target color of hair is performed by an electronic interface to a salon management software program.

3. The method of claim 1 wherein said computer is a local computing device.

4. The Method of claim 1 wherein said computer is a distributed network.

5. The method of claim further comprising the step of updating said database on said computer with improved and refined formulas for changing said initial haircolor to said target color of hair.

6. The method of claim 1 wherein said optical device is selected from the group consisting of a color chart, a colorimeter, a spectrophotometer, and a scanner.

7. A system for creating a haircolor formula comprising:
a. a computer,
b. a haircolor formulating algorithm contained in said computer, wherein the haircolor formulating algorithm analyzes a progression of changes in hair being colored to provide optimized hair color formula information;
c. a database comprising formulas for changing an initial haircolor and state of hair to a target color of hair, said database being operatively coupled to said haircolor formulating algorithm, and
d. an output port operatively coupled to said computer for communicating hair color formula information to an output device.

8. The system of claim 7 wherein said output device is an electronic interface to a salon management software program.

9. The system of claim 7 wherein said computer is a local computing device.

10. The system of claim 7 wherein said computer is a distributed network.

11. The system of claim 7 further comprising an expert system for updating said database with improved and refined formulas for changing said initial haircolor to said target color of hair.

12. The system of claim 7 further comprising a colorimeter.

13. The system of claim 7 further comprising a spectrophotometer.

14. The system of claim 7 further comprising a scanner.

15. A system for creating a haircolor formula comprising:
a. a mobile zone comprising wireless portable computing devices wherein said wireless portable computing devices contain a haircolor formulating algorithm for determining if a target color of hair will be achieved by analyzing a progression of color changes in hair,
b. a desktop zone comprising computers containing a haircolor formulating algorithm for determining if a target color of hair will be achieved by analyzing a progression of color changes in hair wherein said haircolor formulating algorithm is operatively coupled to a database containing formulas for changing an initial haircolor to a target haircolor and wherein said wireless portable computing devices are in wireless communication with said computers
c. a web zone comprising a Web server operatively coupled to a database containing formulas for changing an initial haircolor to a target haircolor, said Web server being accessible to said wireless portable computing devices, and
d. an output port operatively coupled to said wireless computing devices for communicating haircolor formula information to an output device.

16. A system for updating haircolor formulating software comprising:
a. a computer that contains haircolor formulating software having an algorithm for determining if a target color of hair will be achieved by analyzing a progression of color changes in hair;
b. a database comprising formulas for changing an initial haircolor and state of hair to a target color of hair, said database being operatively coupled to said haircolor formulating software;
c. a portable computing device for assisting with the formulation of haircolor, said portable computing device wirelessly connected to said computer;
d. an interact connection to said computer; and
e. a hosting service provided by way of an Internet connection for delivering updates to said database wherein the updates contain improvements and refinements to the formulas for changing an initial haircolor and state of hair to a target color of hair.

17. The system of claim 16 wherein said computer is a portable computing device.

18. A computer implemented method for determining, optimal haircolor formulas and processes required to achieve a target haircolor specified by a. client, the method comprising the steps of:
a determining an initial haircolor and state of hair to be colored using an optical device;
b. identifying a target color of hair to be colored using a color chart;
c. applying to hair to be colored a haircolor formula and process;
d. entering the haircolor formula and process into a database on a computer;
e. customizing the haircolor formula and process on the computer based on results of previous haircolor applications;
f. entering the customized haircolor formula and process into a database on the computer;
g. determining on said computer if said target color of hair will be achieved by analyzing a progression of color changes in hair;
h. repeating steps a through g with numerous clients and haircolor formulas and processes;
thus creating an expert system on the computer wherein the expert system contains a plurality of haircolor formulas and processes useful in determining optimal haircolor formulas and processes required to meet a target haircolor specified by a client.

19. The method of claim 18 wherein the haircolor formulas and processes on the computer include multiple color lines.

20. A computer implemented method for selecting an original haircolor formula contained in at least one haircolor formulations database on a computer, the method comprising the steps of:
a. accessing client information stored in memory on the computer,
b. entering an application type on the computer;
c. entering a natural color on the computer;
d. entering a percentage of gray on the computer;
e. entering a tamet color on the computer;
f. selecting a color line on the computer;
g. determining on said computer if said target color of hair will he achieved by analyzing a progression of color changes in hair;
h. matching on the computer the client information, application type, natural color, percentage of gray, target color, and color line to an original haircolor formula contained in the haircolor forimilations database; and
i. outputting on the computer the resulting original haircolor formula.

21. The method of claim 20 wherein the haircolor formulations database includes multiple color lines.

22. The method of claim 20 further including the step of presenting on a computer display the resulting haircolor formula along with alternative color line haircolor formulas.

23. An apparatus for determining haircolor formulas and processes to achieve a target haircolor specified by a client comprising:
a storage device;
a processor connected to the storage device, the storage device storing client information and at least one database of haircolor formulas; and a program for controlling the processor; and the processor operative with the program to access client information stored in the storage device, receive input on a client's desired application type, receive input on a client's natural color, receive input on a client's percentage of gray, receive input on a client's specified target color, provide selection criteria to a user for selecting a color line, receive input from a user on a selected color line, determine if said target color of hair will be achieved by analyzing a progression of color changes in hair, match the client information, application type, natural color, percentage of gray, specified target color, and selected color line to a haircolor formula contained in the database of haircolor formulas, and output the resulting haircolor formula.

24. The apparatus of claim 23, wherein the storage device is remotely connected to the processor.

25. The apparatus of claim 23, wherein the at least one database of haircolor formulas includes haircolor formulas for multiple color lines.

26. The apparatus of claim 23, wherein the apparatus is handheld.

27. The apparatus of claim 23, wherein the apparatus is portable.

* * * * *

UNITED STATES PATENT AND TRADEMARK OFFICE
CERTIFICATE OF CORRECTION

PATENT NO. : 7,877,294 B2
APPLICATION NO. : 11/260098
DATED : January 25, 2011
INVENTOR(S) : Charles J. Inzinna, Jr.

It is certified that error appears in the above-identified patent and that said Letters Patent is hereby corrected as shown below:

Column 14, line 36, claim 1, 'haire-color' should read --haircolor--.

Column 14, line 60, claim 5, 'The method of claim further comprising' should read --The method of claim 1 further comprising--.

Column 15, line 64, claim 16, 'interact' should read --internet--.

Column 16, line 7, claim 18, 'specified by a. client' should read --specified by a client--.

Column 16, line 44, claim 20, 'tamet' should read --target--.

Column 16, line 52, claim 20, 'forimilations' should read --formulations--.

Signed and Sealed this
Tenth Day of May, 2011

David J. Kappos
*Director of the United States Patent and Trademark Office*